Patented Feb. 2, 1926.

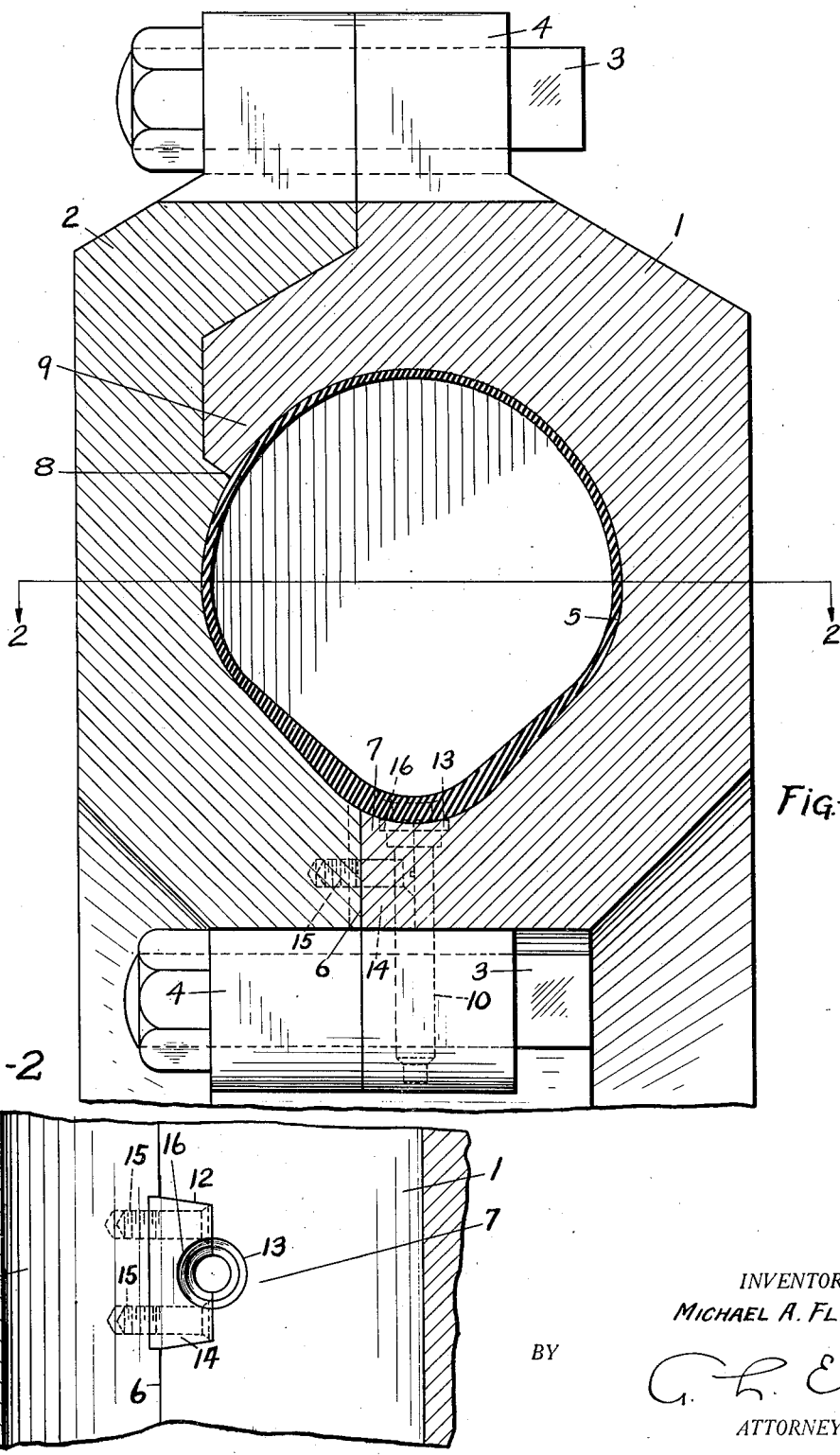

1,571,193

UNITED STATES PATENT OFFICE.

MICHAEL A. FLYNN, OF AKRON, OHIO.

MOLD FOR CURING INNER TUBES.

Application filed June 25, 1925. Serial No. 39,499.

*To all whom it may concern:*

Be it known that I, MICHAEL A. FLYNN, a citizen of the United States, and a resident of Akron, county of Summit, State of Ohio, have invented certain new and useful Improvements in Molds for Curing Inner Tubes, of which the following is a specification.

This invention relates to an apparatus for use in vulcanizing inner tubes under pressure, and particularly to molds adapted and designed for such purposes.

Heretofore, molds for curing inner tubes under pressure have been divided into two equal portions along lines at the inner and outer circumferences, and as a result the tubes have been formed with a rind or flash which is located at the tread of the tire and causes undue wear and failure of the tube. In addition, there has been a tendency for pinching the tube at the inner circumference due to the tendency of the uncured tube to contract, which has been counteracted by the use of a separate ring at the inner circumference of the tube. The object of the present invention is to eliminate the objections noted and to provide a mold in which the tubes will not be pinched and will be without the rind or flash at the tread.

Another object of the invention is to produce a mold particularly adapted for large tubes such as used in bus tires, the mold comprising two sections enclosing the tube cavity which is substantially circular in cross-section, the sections being divided along lines which insure the location of approximately two-thirds of the mold cavity in one section, the walls of that section overhanging the cavity on the inner and outer circumferences of the tube. As a result, the tube is held in place under slight inflation by the overhanging portions of the mold and will not easily become displaced in applying the remaining section of the mold. The construction here shown will insure a perfect curing of the tube about its inner circumference. By the use of the mold it is possible to secure a much greater production than with the devices of the prior art. Other objects and advantages will be obtained as apparent to those skilled in the art.

In the drawings is illustrated one form of the invention, Figure 1 being a section through the mold and Figure 2 being a fragmentary elevation at the valve stem.

The mold comprises upper and lower sections 1 and 2, respectively, which are shown as secured by bolts 3 passing through lugs 4. It will be observed that the cavity for the tube 5 is formed within the two sections, but that approximately 240° of the entire tube cavity are within the lower section and the remainder within the upper section. In order to secure this result, the dividing line 6 at the inner circumference of the tube is placed above the horizontal diameter of the tube for a sufficient distance so that the inner circumference of the tube rests against the wall 7 and is not liable to be pinched between the mold sections as frequently happened when the division line of the mold occurred at that point.

The dividing line 8 on the outer portion of the tube is located upon the side of the tube spaced from the tread, this result being accomplished by forming the lower half of the mold with an upstanding circumferential wall 9, the lateral surfaces or shoulders of which are tapered, being designed to be received in a corresponding groove in the upper half of the mold. The rind or flash occasioned by the dividing line between the mold sections on the outer surface of the tube is therefore removed for a considerable distance from the tread of the tire and a tube cured within this mold will not chafe the interior of the tire casing.

In order to permit the easy insertion of the valve stem 10, the inner circumference of the lower mold half 1 is formed with a recess 12, at the lowermost point of which is formed a semi-circular depression 13. A block 14 is attached by screws 15 to the upper mold half 2 and is received within the recess 12, the block being provided with a semi-circular depression 16 which mates with the depression 13 to form the opening for the valve stem 14.

It will be noted that the cavity for the inner tube is substantially circular, except that it is slightly altered to obtain a tube nearly tire shape. The shape of the cavity may be circular if desired and other changes may be made within the scope of the invention.

What is claimed is:

1. A mold for curing inner tubes under pressure, comprising two sections enclosing a substantially circular cavity for the tube, both dividing lines between the sections being located on the same side of the center of the tube, thereby forming one section of such size that it overhangs the cavity at the inner and outer circumferences of the tube.

2. A mold for curing inner tubes under pressure, comprising two sections enclosing a substantially circular cavity for the tube, the dividing lines between the sections being located on the same side of the center of the tube with approximately two-thirds of the cavity enclosed within a section, the said section overhanging the cavity at the inner and outer circumferences of the tube.

3. A mold for curing inner tubes under pressure, comprising two sections enclosing a substantially circular cavity for the tube, the sections parting along lines located at one side of the center of the tube, so that one of the sections overhangs the cavity at the inner and outer circumferences of the tube and a rib having oppositely tapered shoulders, formed on one section, the other section being formed with a correspondingly shaped groove.

MICHAEL A. FLYNN.